Figure 1:
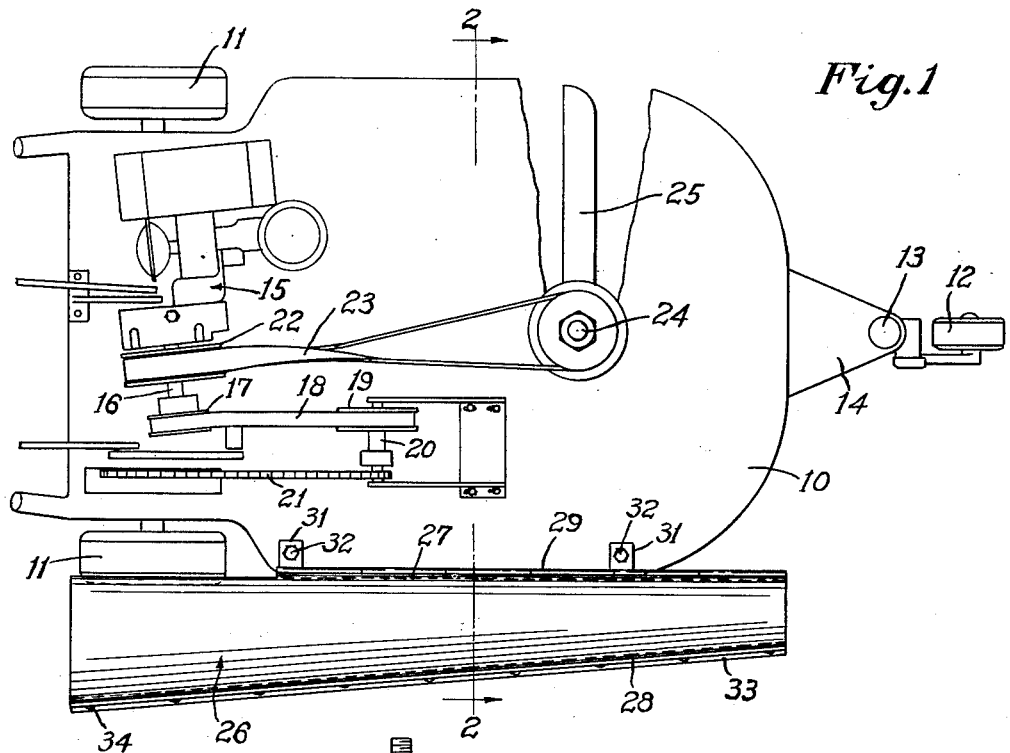

Jan. 17, 1950 A. STUHL 2,495,032
WINDROWING ATTACHMENT FOR LAWN MOWERS
Filed Feb. 10, 1948

Inventor
Andrew Stuhl
By Frease and Bishop
Attorneys

Patented Jan. 17, 1950

2,495,032

UNITED STATES PATENT OFFICE 2,495,032

WINDROWING ATTACHMENT FOR LAWN MOWERS

Andrew Stuhl, Navarre, Ohio

Application February 10, 1948, Serial No. 7,308

5 Claims. (Cl. 56—189)

The invention relates to lawn mowers, and more particularly to an attachment for the type of mower having a horizontal, rotary cutting blade.

It is an object of the invention to provide an attachment for a mower of this type, which will gather the grass cuttings and distribute them in a windrow in the path of the mower.

Another object is to provide such an attachment in the form of a side board depending from one side of the base plate of the mower to a point substantially in contact with the ground.

A further object is to provide such an attachment in the form of an inverted channel, the top of which extends some distance above the top of the base plate, so as to accommodate the grass cuttings.

A still further object is to provide such an attachment having a flexible strip at its lower edge for contact with the ground.

Another object of the invention is to provide an attachment of the character referred to in the form of an inverted channel which is tapered toward its forward end.

A further object is to provide such a mower attachment which is hingedly connected to the mower so that it may be easily and readily moved to inoperative position when it is desired to scatter the grass cuttings rather than to collect them in windrow.

Figure 2:
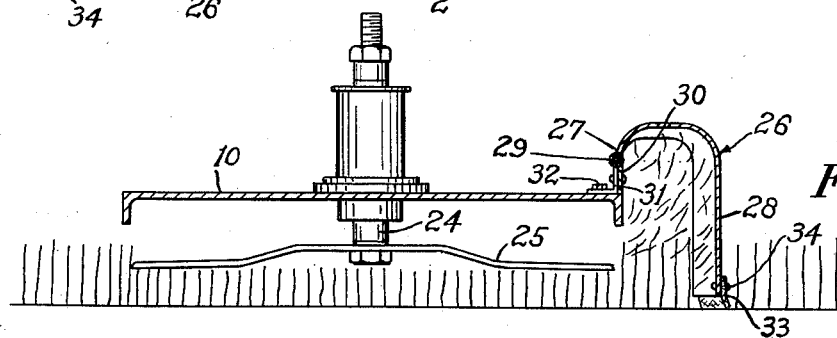

The above objects together with others which will be apparent from the drawing and following description or which may be later referred to, may be attained by constructing the improved mower attachment in the manner hereinafter described in detail and illustrated in the accompanying drawing, in which:

Figure 1 is a top plan view of a mower showing the improved attachment mounted thereon;

Fig. 2 a section taken as on the line 2—2, Fig. 1; and

Figure 3:
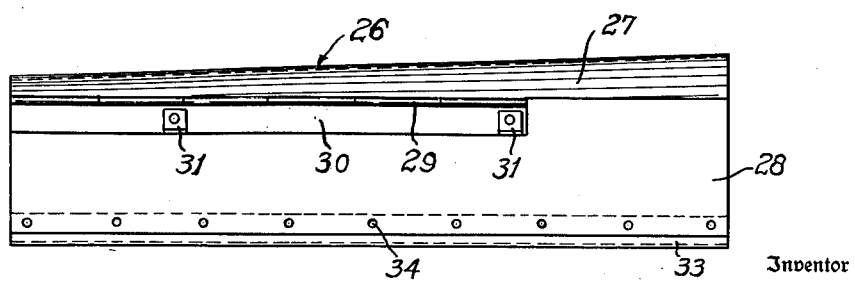

Fig. 3 a detached inside elevation of the attachment.

Referring now more particularly to the form of the invention illustrated in the accompanying drawing, in which similar numerals refer to similar parts throughout the several views, the attachment is designed for use upon the type of mower illustrated which comprises the horizontal base plate 10, mounted upon the two rear traction wheels 11 and the forward caster wheel 12 which is shown swivelled as at 13 to an ear 14 upon the front of the base plate, so as to support the base plate spaced above the ground as indicated in Fig. 2.

Power may be furnished by means of an internal combustion engine, indicated generally at 15, the power take off shaft 16 of which has a pulley 17 connected by belt 18 with pulley 19 upon the jack shaft 20, which is connected by chain or belt drive 21 to the traction wheels 11.

A pulley 22 is also mounted upon the engine shaft 16 and connected by a belt 23 with the vertical shaft 24, upon which the horizontal rotary cutter blade 25 is fixed, being adjustable vertically beneath the base plate 10 so as to cut the grass at any desired height.

All of the above described parts are shown as on a type of mower now obtainable upon the market and in themselves form no part of the present invention which pertains only to an attachment for mowers of this general type.

In the operation of such mowers, the horizontal, rotary cutting blade 25 as it cuts the grass throws the grass cuttings outwardly at the side of the mower scattering them upon the lawn. However, when the grass is long it usually is not desirable to have the heavy cuttings scattered over the cut lawn and under ordinary circumstances it is necessary to rake the entire lawn after it has been mowed in order to collect these heavy cuttings.

The novel attachment which will now be described, is provided for the purpose of collecting the grass cuttings and distributing them in windrows upon the cut lawn so that they may be easily raked together for removal.

The improved attachment is in the form of an inverted channel, formed of sheet metal or the like, indicated generally at 26. Preferably this channel is tapered from the rear toward the front, as shown in the drawing, and the inner leg 27 of the channel is of considerably less height than the outer leg 28 which extends to a point substantially in contact with the ground, as best shown in Fig. 2.

The inner leg 27 of the channel is preferably hingedly connected to the adjacent side of the base plate 10 of the mower and this may be accomplished by means of the hinge joint 29, hingedly connecting the channel member 26 to the straight narrow strips 30 which may be provided with angular brackets 31 for detachably connecting the same to the base plate 10 as by screws 32.

The lower edge of the outer leg 28 of the channel member may be arranged to substantially contact the surface of the ground, but in order to compensate for variations in the contour of the lawn, this edge is preferably terminated a short distance above the ground level and a flexible strip 33 of fabric, or other suitable material, may be connected to the lower portion of the leg 28, as by the rivets 34, so as to be at all times in contact with the ground.

With the attachment in the operative position as shown in Figs. 1 and 2, as the mower is operated the grass cuttings will be thrown against the depending outer leg 28 of the channel shape attachment and will accumulate within the inverted channel extending above the level of the base plate, the rearwardly flared or enlarged channel providing sufficient space to gather all of the grass cuttings as well as any leaves which may be lying upon the ground and which will be thrown into the attachment by means of the rotary cutting blade.

As the mower continues to move forwardly this accumulation of grass cuttings, leaves and the like will be deposited in a windrow upon the ground at the right side of the path of the mower and may be easily raked or swept up for removal from the ground.

If the grass is not very long and it is desired to scatter the grass cuttings over the lawn to form a mulch, it is only necessary to swing the channel member 26 upward upon the hinged joint 29 so that the mower may operate in conventional manner and the grass cuttings be thown out beneath the side of the base plate and distributed or scattered over the lawn.

I claim:

1. A windrowing attachment for a mower having a horizontal base plate and a horizontal rotary cutting blade below the base plate, said windrowing attachment comprising an inverted channel having an inner relatively short leg and an outer relatively long leg, and means for connecting the lower edge of the short leg to one side of the base plate in such position that the top of the channel extends above the base plate and the lower edge of the long leg is in substantial contact with the ground.

2. A windrowing attachment for a mower having a horizontal base plate and a horizontal rotary cutting blade below the base plate, said windrowing attachment comprising an inverted channel having an inner relatively short leg and an outer relatively long leg, and means for adjustably connecting the lower edge of the short leg to one side of the base plate in such position that the top of the channel extends above the base plate and the lower edge of the long leg is normally in substantial contact with the ground, and the attachment may be adjusted so that said long leg is located above the base plate.

3. A windrowing attachment for a mower having a horizontal base plate and a horizontal rotary cutting blade below the base plate, said windrowing attachment comprising an inverted channel having an inner relatively short leg and an outer relatively long leg, said channel being tapered in height toward its forward end, and means for connecting the lower edge of the short leg to one side of the base plate in such position that the top of the channel extends above the base plate and the lower edge of the long leg is in substantial contact with the ground.

4. A windrowing attachment for a mower having a horizontal base plate and a horizontal rotary cutting blade below the base plate, said windrowing attachment comprising an inverted channel having an inner relatively short leg and an outer relatively long leg, said channel being tapered in width toward its forward end, and means for connecting the lower edge of the short leg to one side of the base plate in such position that the top of the channel extends above the base plate and the lower edge of the long leg is in substantial contact with the ground.

5. A windrowing attachment for a mower having a horizontal base plate and a horizontal rotary cutting blade below the base plate, said windrowing attachment comprising an inverted channel having an inner relatively short leg and an outer relatively long leg, said channel being tapered in height and width toward its forward end, and means for connecting the lower edge of the short leg to one side of the base plate in such position that the top of the channel extends above the base plate and the lower edge of the long leg is in substantial contact with the ground.

ANDREW STUHL.

REFERENCES CITED

The following references are of record in the file of this patent:

UNITED STATES PATENTS

| Number | Name | Date |
| --- | --- | --- |
| D. 35,191 | Fagan | Oct. 15, 1901 |
| 1,951,105 | Myers | Mar. 13, 1934 |
| 2,017,524 | Bolens | Oct. 15, 1935 |
| 2,208,972 | Goodall | July 23, 1940 |
| 2,390,321 | Packwood | Dec. 4, 1945 |